United States Patent
Roth et al.

(10) Patent No.: US 8,156,342 B2
(45) Date of Patent: Apr. 10, 2012

(54) PROGRESS INDICATORS TO ENCOURAGE MORE SECURE BEHAVIORS

(75) Inventors: Volker Roth, San Francisco, CA (US); Thea Turner, Menlo Park, CA (US)

(73) Assignee: Fuji Xerox Co., Ltd, Tokyo (JP)

( * ) Notice: Subject to any disclaimer, the term of this patent is extended or adjusted under 35 U.S.C. 154(b) by 1204 days.

(21) Appl. No.: 11/859,664

(22) Filed: Sep. 21, 2007

(65) Prior Publication Data
US 2009/0083859 A1    Mar. 26, 2009

(51) Int. Cl.
*G06F 21/00* (2006.01)
(52) U.S. Cl. .................... 713/183; 715/772
(58) Field of Classification Search ............ 713/183; 715/772
See application file for complete search history.

(56) References Cited

U.S. PATENT DOCUMENTS

| | | | | |
|---|---|---|---|---|
| 5,355,889 | A * | 10/1994 | Nevo et al. | 600/484 |
| 5,946,666 | A * | 8/1999 | Nevo et al. | 705/36 R |
| 6,934,916 | B1 | 8/2005 | Webb et al. | |
| 7,043,548 | B2 | 5/2006 | Bouet | |
| 7,460,917 | B1 * | 12/2008 | Reichard et al. | 700/47 |
| 2004/0186814 | A1 * | 9/2004 | Chalermkraivuth et al. | 706/16 |
| 2004/0199633 | A1 * | 10/2004 | Pearson | 709/226 |
| 2004/0250139 | A1 * | 12/2004 | Hurley | 713/202 |
| 2005/0235341 | A1 * | 10/2005 | Stieglitz et al. | 726/5 |
| 2007/0006279 | A1 * | 1/2007 | Brown et al. | 726/1 |
| 2007/0179753 | A1 * | 8/2007 | Barajas et al. | 702/189 |
| 2008/0066174 | A1 * | 3/2008 | Miller | 726/19 |
| 2008/0307235 | A1 * | 12/2008 | Keohane et al. | 713/183 |
| 2009/0083859 | A1 * | 3/2009 | Roth et al. | 726/28 |
| 2009/0313696 | A1 * | 12/2009 | Himberger et al. | 726/22 |

OTHER PUBLICATIONS

Berque, Dave, "Implementing Progress Indicators for Recursive Algorithms," ACM-SAC 93/2/93/IN, USA, 1993, pp. 533-538.
Conlan, Richard M., "Improving Interface Designs to Help Users Choose Better Passwords," CHI 2006, Work in Progress, Apr. 22-27, 2006, Montreal, Quebec, Canada, pp. 652-657.
Conrad, Frederick, "Impact of Progress Feedback on Task Completion: First Impressions Matter," CHI 2005, Late Breaking Results: Short Papers, Apr. 2-7, 2005, Portland, Oregon, USA, pp. 1921-1924.
Myers, Brad, "The Importance of Percent-Done Progress Indicators for Computer-Human Interfaces," University of Toronto, CHI '85 Proceedings, Apr. 1985, pp. 11-17.
Yee, Ka-Ping, "Passpet: Convenient Password Management and Phishing Protection," University of California, Berekely, Symposium on Usable Privacy and Security (SOUPS) 2006. Jul. 12-14, 2006, Pittsburgh, PA, USA.

* cited by examiner

*Primary Examiner* — Kim Vu
*Assistant Examiner* — Sayed Beheshti Shirazi
(74) *Attorney, Agent, or Firm* — Sughrue Mion, PLLC

(57) ABSTRACT

A method for enticing users to behave securely in a computing environment. For security related input, such as selection of password, a progress indicator is provided to the user. The progress indicator correlates to the level of security obtained by the user's entry, rather than to the completion of the task. The indicator follows a non-linear function that crosses zero security and maximum expected security for the task. The function starts at shallow slope, increases towards the middle, and then reverts to shallow slop towards the end of the task.

18 Claims, 2 Drawing Sheets

PROGRESS INDICATORS TO ENCOURAGE MORE SECURE BEHAVIORS

BACKGROUND

1. Field of the Invention

The subject invention relates to progress indicators, such as progress bars indicating task progress. The subject invention also relates to methods of encouraging secure behavior, especially secure behavior in electronic communication.

2. Related Art

Progress indicators, such as progress bars, are well known and widely used, especially in computing environments. Progress bars are used, e.g., to indicate the progress of a file download to a computer or other computing machines, such as handheld units. Such bars generally progress linearly according to the size of the file and the part that has been downloaded up to the indicated point. Progress bars are also used when a user has to perform a given task, so as to indicate the progress of the user towards the completion of the task. Again, such progress indicators generally relate to the part completed, as compared to the total task. Progress indicators may also be used for task relating to security features. For example, a progress bar may be displayed when a user is asked to enter a password. However, using prior art methodology, such progress bars indicate the amount of task that is completed. For example, if the user is asked to enter a password of length between 6-8 characters, the progress bar would linearly advance according to the how many characters the user entered as compared to how many the user must enter.

The security derived from cryptographic mechanisms is measured by a work factor k. Here, k corresponds to the length of a cryptographic key or (the entropy of) a password measured in bits. For manual key entry or verification tasks, given a problem with a work factor of k, it is common to assume that an adversary requires $2^k$ units of work in order to breach the security. Alternatively, the adversary's probability of breaching the security is about $2^{-k}$ in each attempt. User interfaces that require a user to enter a password or to verify two cryptographic keys for equality typically show progress by rendering a linear display of the work factor. This is highly misleading because the displayed progress differs significantly from the actual level of attained security, which is exponential in the work factor. On the other hand, an accurate rendering of the attained security would be frustrating for users as no progress would be visible for the majority of the interactions.

FIG. 1A illustrate a progress bar according to the prior art, used for a password generation or key verification task. As is shown, the progress is generated linearly with the data entry by the user. Such a progress bar is beneficial in providing the user an indication of progress in completing the task, but may be misleading with respect to the level of security obtained. For example, according to the illustration of FIG. 1A, the advancement made from 0.25 to 0.625 is more than double, while the security has not doubled while advancing via these steps.

FIG. 1B illustrates a progress bar that directly correlates to the level of security attained with the user's input. The bars of FIG. 1B correspond to the bars of FIG. 1A. As can be seen, providing a progress bar that directly correlates to the security level attained may be somewhat puzzling or frustrating to the user, as in the early stage no progress indication would be provided, as the level of security attained is too low to be represented in this scale.

Accordingly, there is a need in the art to provide a progress indicator that more properly reflects the level of security attained, as correlated to the task progress.

SUMMARY

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The subject invention provides a solution that occupies a middle ground between progress indicator that is linearly correlated to the task progress and a progress indicator that accurately reflects security progress. The rendering is not completely faithful to either one of the approaches discussed above, but it is meant to entice users to behave more securely than in the linear case without frustrating them, as the exponential case certainly would.

According to various aspects of the invention, a method for providing a security progression indication to a user is provided, comprising: selecting maximum expected security level; selecting a non-linear function that crosses zero security level and the maximum expected security level; and generating a security level display that progresses with the user's input according to the non-linear function. The non-linear function may follow an S-curve. The non-linear function may follow a shallow slope at a range adjacent to zero security, an increased slope at mid-range, and reverts to shallow slope at a range adjacent the maximum expected security. The non-linear function may follow a Bezier curve. The non-linear function may be bounded by a linear function and an exponential function representing the work function necessary to breach security. Selecting a maximum expected security level may comprise selecting a plurality of maximum expected levels, and wherein selecting a non-linear function comprises selecting a plurality of non-linear functions, each corresponding to one of the maximum expected levels, and wherein generating the display comprises monitoring the totality of the user's input to determine which of the plurality of non-linear functions should be used to generate the display. The method may further comprise generating a task progress display correlated to the amount of completion of a task by the user. The method may further comprise generating security score display providing an indication of the security level of the user's complete entry with respect to the search space corresponding to the user's complete entry. Generating a security level display comprises generating a progression bar display. Generating a security score display may comprise generating a numerical display.

According to other aspects of the invention, a method for encouraging secure behavior in a computing environment is provided, comprising: prompting the user to complete a task by entering a plurality of input characters; defining a zero security level and a maximum security level for completion of the task; selecting a non-linear function that crosses the zero security level and the maximum security level; and monitoring the user's input of characters and in response generating a security level display that progresses with the user's input of characters according to the non-linear function. The task may comprise at least one of: entering a password, generating an electronic key, verify integrity of a code, and verifying authenticity of a code. The non-linear function may follow an S-curve. The non-linear function may follow a Bezier curve. The non-linear function may follow a shallow slope at a range adjacent to zero security, an increased slope at mid-range, and reverts to shallow slope at a range adjacent the maximum expected security. Selecting a maximum expected security level may comprise selecting a plurality of maximum expected levels, and wherein selecting a non-linear function comprises selecting a plurality of non-linear functions, each corresponding to one of the maximum expected levels, and wherein generating the display comprises monitoring the totality of the user's input to determine which of the plurality of non-linear functions should be used to generate the display. The method may further comprise generating a task progress display correlated to the amount of completion of the task by the user. The task progress display may follow a linear function. The method may further comprise generating security score display providing an indication of the security level of the user's complete entry with respect to the search space corresponding to the user's complete entry. Generating a security level display may comprise generating a progression bar display. Generating a security score display may comprise generating a color-coded display. The non-linear function may be bounded between a linear function and an exponential function representing the work function necessary to breach security.

Other aspects and features may be apparent from the following non-limiting description of various embodiments of the invention.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1A illustrates a linear progress bar, while FIG. 1B illustrates a progress bar that directly correlates with the level of security attained.

FIG. 2 illustrates a plot of proportional progress vs. proportional user input.

DETAILED DESCRIPTION

Various embodiments of the invention provide progress indicators that have functional correlation to the level of security attained. The progress indicators according to embodiments of the invention entice a secure behavior by the user, while avoiding frustrating the user.

Current security technology may require users to generate passwords, verify two cryptographic keys, produce "randomness" for key generation, etc. Typically, the security derived from n units of work of the user is such that an opponent would have to perform in the order of $b^n$ units of work, where b is a suitable base. For instance, if the entropy of an English letter is 1.3 bits and the user enters a password with n letters then it is fair to assume that an adversary must perform in the order of $1.3^n$ units of work in order to break the password by brute force.

During the aforementioned tasks, modern systems provide feedback to the user in the form of progress indicators, which are known to be an important and useful interface tool. These progress indicators are meant to indicate the level of security that a user has achieved at any given time so that the user can make an informed trade-off between the amount of work he or she wishes to spend and the desired security level. Therefore, the progress indicator has an influence on the amount of work the user is motivated and willing to spend on the task.

It is common to indicate progress by a linear display of the user's work up to a desired maximum. For instance, if 80 bits worth of entropy are desired for a password then for each added letter the progress bar would advance a fraction of 80. However, this suggests to the user that the increase in security is linear in the amount of work he or she spends, which is very misleading.

Figures 1A, 1B, 2:
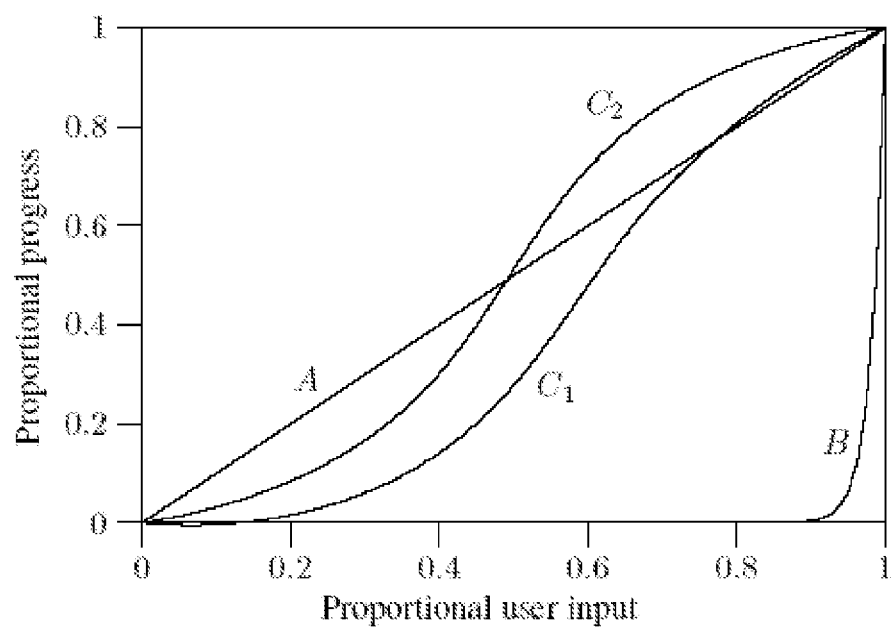

FIG. 2 illustrates a plot of proportional progress vs. proportional user input. The abscissa gives the proportion of work performed by the user towards the desired maximum level of security. The ordinate gives the proportion of security achieved up to the desired maximum level. The linear curve, A, illustrates the prior art linear correlation to user input, while exponential curve B illustrates the progress' correlation to real level of security attained, i.e., the estimated work, k, required to breach security given a base b=2. As can be seen from curve B, illustrating direct correlation to level of security is somewhat impractical, as the user would not see any progress for several steps. Therefore, according to embodiments of the invention, modified correlation is provided to illustrate the progress.

For instance, the progress indicator can advance slower in the beginning so that users are less optimistic about the achieved level of security. During the middle, the indicator advances faster in order to keep the user motivated and to feed his or her desire to achieve maximum security. Subsequently, the indicator slows down in order not to overshoot its bounds towards the maximal security level.

Notably, it has been proposed in the prior art that providing a "slow-to-fast" progress indicator, e.g., an indicator that initially progresses slower than linear and then accelerates towards the end, is detrimental and causes user disengagement (break off). However, in contrast to such suggestion in the prior art, the inventors of the subject invention propose that using a functional slow-fast-slow progress indicator may lead users to a more secure behavior.

Two examples of slow-to-fast functions according to embodiments of the invention are shown in FIG. 2 by graph $C_1$ and graph $C_2$. Graph $C_1$ increases at a rate between that of A and B. After an accelerated growth rate in the middle range, the function plateaus at a level that is similar to A. Thus, the function $C_1$ is generally between the curves representing user input (A) and attacker work to breach security (B). It gives the user a sense that progress is being made toward a reasonable level of security, but does not over represent the level of security attained. By accelerating the progress bar in the middle range, the user will have a sense that rapid progress is being made and that further efforts will pay off in measurably better security. This will encourage the user to continue, leading to better security, although not to the level suggested by A. Graph $C_2$ is similar, except that it actually accelerates to a higher value more quickly than $C_1$, leading to a value in the progress indicator that is even higher than A. For certain users in certain contexts, the closeness to the maximum to be obtained is a strong motivator.

The expected benefit of this approach would be to entice users to perform more units of work on average. Since the level of security increases exponentially with the user's work, enticing the user to perform one more unit of work (compared to the prior art case) would double the attained level of security. This in turn would have a positive impact on the bottom-line security for organizations whose security against attacks on their IT infrastructure often depends on the weakest link.

Figure 3:
FIG. 3 illustrates an embodiment having a progress and security level indicators, according to the invention.
Figure 3:

In some instances, there may be tension developed between the need to provide the user with an indication of task progress and an indication of security level. In such cases, two indicators may be provided, as illustrated in FIG. 3. In FIG. 3, the top indicator, labeled "progress" indicates a linear relationship to the task completion, while the bottom indicator, labeled "security level" indicates a functional relationship to the level of security attained.

As can be understood, embodiments of the invention may use various functions to generate the progression curve that, while may not have a direct functional relation to the security attained, provides the user an apprehension of improved security and entice the user to perform more units of work to achieve higher security. In some embodiments the functions are also designed so as not to convey a "too optimistic" view of the security achieved, i.e., not more optimistic than a linear display, although this is not an absolute requirement, as will be illustrated by curve $C_2$. In the example illustrated in curve $C_1$ of FIG. 2, a Bezier function is used. However, this is just one example of a function that may be used. In general, the curve is an S-shaped curve having a relatively shallow slop at the beginning, increasing slop about the middle section, and shallow slop towards the end.

The security measure depends on the expected entropy of each entry. Thus for example, if the password is of 8 characters that together spell an English word, then the search space is much smaller than if the 8 characters were random and did not correspond to an English word. Moreover, if the characters involve numerical characters and random lower case and capital letters, then the search space is much increased and likelihood of a breach is diminished. Various embodiments of the invention resolve this issue in different ways.

According to one embodiment of the invention, an expected search space is assumed, and the function is generated according to the expected search space. The expected search space may be determined experimentally, or by using some averaging function of the search spaces available, e.g., averaging of search spaces for random lowercase letters, English words, English words and numbers, random numbers and letters, etc. In this manner, the progress bar would provide an indication of security relative to some expected search field, regardless of the search field of the password generated by the user.

According to another embodiment of the invention, several curves are generated, each corresponding to one search space. As the user progresses in its task, different curves may be used as the system learns more about the user's entries. For example, on initial entry it is not clear whether the user will input an English word. Therefore, the random letters space may be used. Then, if the user inputs a number, the function may be changed to that representing search space of letters and numbers, and so on. Similarly, at the start the function corresponding to the expected search space may be used, and as the user progresses a different curve may be used as more information becomes available about the user's chosen password.

As can be appreciated, according to embodiments of the invention, the advancement of the progress bar may be correlated not to the progress in the user's completion of the task at hand, but rather according to a function that stimulates secure behavior. The function may be selected according to the entropy ascribed to the user's entries. As characters are entered, the entropy of the character, as related to the increased security or the work it takes to break the code, is used to select the appropriate function for the progression of the progress bar. An apparent disadvantage of such an embodiment is that as more characters are added, the security level may actually go down, resulting in the progress bar reverting to a lower value. For example, if after typing five letters the system recognizes that the letters form an English word, the search space is dramatically reduced and the security drops. Consequently, the maximum attainable security is lower, and the function selected for the progress bar would reflect that. On the other hand, this may further encourage the user to select a more secure password that correspond to a larger search space then the chosen password.

With respect to the illustration of FIG. 2, in order to generate the curve according to any of the embodiments of the invention, one may take the origin as zero security, while the maximum value on the y-axis as the maximum security attainable for the requested input. For example, if the requested input is a password of 8 characters, the maximum value on the y-axis would correspond to the security attained by entering 8 random characters, which may include lowercase, uppercase, and numbers. A curve is then fit between these two values (which may be normalized). Then, each entry of the user provides an $\epsilon$ advancement on the curve. According to some embodiments of the invention, the curve is mapped to be between a linear curve, i.e., $x+\epsilon \rightarrow a+\epsilon$, and the exponential curve that is characteristic of the increased security, i.e., $x+\epsilon \rightarrow a^{(x+\epsilon)}$.

As noted above, a Bezier curve may be used to generate the progress bar. A way to illustrate the advancement per user input in a somewhat mathematical or formal way would be as follows: where x is the amount of user input and y is the current progress display, the new progress display y' for additional user input, $\epsilon$, would be y' such that $(x+\epsilon, y')$ is a point on a two-dimensional Bezier curve f from (0,0) to (1,1), where (0,0) represents no security and (1,1) represents the maximum level of security desired for the application.

Figure 4A:
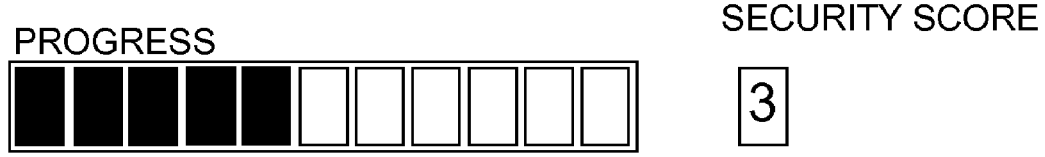
FIGS. 4A and 4B illustrate embodiments wherein an indication of the total security achieved is provided in addition to the progress bar.
Figure 4B:
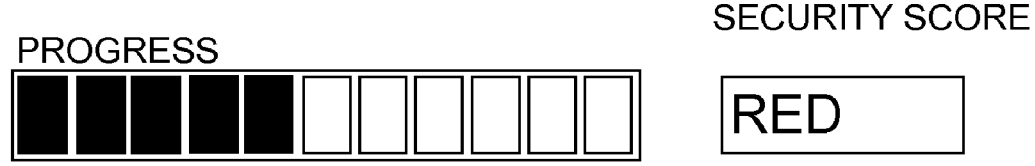

According to yet another example, a progress bar advances according to a function that terminates in expected security. However, once the user completes the entry, the complete password is examined to determine its search space. For example, the entry may be compared to an onboard dictionary. When the search space is determined, the user is given an indication of the security level based on the search space. Examples of such embodiments are shown in FIGS. 4A and 4B. In FIG. 4A, the progress bar advances according to a function according to any of the described embodiments. The security score changes according to the search space of the total entry. Consequently, if the complete entry is an English word, a social security number, a birth date, etc. the score would be lower than if the total entry is composed of random lowercase, upper case, and numbers. In FIG. 4B, the same concept is followed, except that a different color is used to convey security level of the total entry.

As can be appreciated, the progress indicator according to the embodiments of the invention progresses according to a non-linear parameterized function that, while not correlates the user entry to the level of security attainable by the completed entry, entices user to invest more units of work in order to achieve higher security. This is in contrast to the prior art, where the progress is linear or correlates to the advancement of completion of the task, rather than to the security attained.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for providing a security progression indication to a user, comprising:
  a. selecting maximum expected security level; wherein selecting a maximum expected security level comprises selecting a plurality of maximum expected levels, and wherein selecting a nonlinear function comprises selecting a plurality of non-linear functions, each corresponding to one of the maximum expected levels, and wherein generating the display comprises monitoring the totality of the user's input to determine which of the plurality of non-linear functions should be used to generate the display;
  b. selecting a non-linear function bounded by a linear function and an exponential function that crosses zero security level and the maximum expected security level, the non-linear function indicative of an estimated work required to breach security of a password generated by user input, the estimated work required to breach security being based on entropy of the user input;
  c. generating in a computing environment a security level display that progress with the user's input for the password according to the estimated work required to breach security indicated by non-linear function and displaying the security level display on a display device.

2. The method of claim 1, wherein the non-linear function follows an S-curve.

3. The method of claim 1, wherein non-linear function follows a shallow slope at a range adjacent to zero security, an increased slope at mid-range, and reverts to shallow slope at a range adjacent the maximum expected security.

4. The method of claim 1, wherein the non-linear function follows a Bezier curve.

5. The method of claim 1, further comprising generating a task progress display correlated to the amount of completion of a task by the user.

6. The method of claim 1, further comprising generating security score display providing an indication of the security level of the user's complete entry with respect to the search space corresponding to the user's complete entry.

7. The method of claim 1, wherein generating a security level display comprises generating a progression bar display.

8. The method of claim 5, wherein generating a security score display comprises generating a numerical display.

9. A method for encouraging secure behavior in a computing environment comprising:
  prompting the user to complete a task by entering a plurality of input characters; defining a zero security level and a maximum security level for completion of the task; wherein selecting a maximum expected security level comprises selecting plurality of maximum expected levels, and wherein selecting a nonlinear function comprises selecting a plurality of non-linear function, each corresponding to one of the maximum expected levels, and wherein generating the
  display comprises monitoring the totality of the user's input to determine which of the plurality of non-linear function should be used to generate the display
  selecting a non-linear function bounded by a linear function and an exponential function that crosses the zero security level and the maximum security level, the non-linear function indicative of an estimated work required to breach security of a password generated by user input, the estimated work required to breach the security being based on entropy of the user input;
  monitoring the user's input of characters and in response generating in a computing environment a security level display that progresses with the user input of characters according to the estimated work required to breach security indicated by the nonlinear function and displaying the security level display on a display device.

10. The method of claim 9, wherein the task comprises at least one of: entering a password, generating an electronic key, verify integrity of a code, and verifying authenticity of a code.

11. The method of claim 9, wherein the non-linear function follows an S-curve.

12. The method of claim 9, wherein the non-linear function follows a Bezier curve.

13. The method of claim 9, wherein non-linear function follows a shallow slope at a range adjacent to zero security, an increased slope at mid-range, and reverts to shallow slope at a range adjacent the maximum expected security.

14. The method of claim 9, further comprising generating a task progress display correlated to the amount of completion of the task by the user.

15. The method of claim 14, wherein the task progress display follows a linear function.

16. The method of claim 9, further comprising generating security score display providing an indication of the security level of the user's complete entry with respect to the search space corresponding to the user's complete entry.

17. The method of claim 9, wherein generating a security level display comprises generating a progression bar display.

18. The method of claim 9, wherein generating a security score display comprises generating a color-coded display.

* * * * *